United States Patent
Dey et al.

(10) Patent No.: US 11,037,104 B2
(45) Date of Patent: Jun. 15, 2021

(54) SYSTEM, METHOD AND COMPUTER PROGRAM PRODUCT FOR REMARKETING AN ADVERTISED RESUME WITHIN GROUPS

(71) Applicant: International Business Machines Corporation, Armonk, NY (US)

(72) Inventors: Kuntal Dey, New Delhi (IN); Seema Nagar, Bangalore (IN); Sudhanshu Shekhar Singh, New Delhi (IN); Roman Vaculin, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 15/400,713

(22) Filed: Jan. 6, 2017

(65) Prior Publication Data
US 2018/0197146 A1  Jul. 12, 2018

(51) Int. Cl.
G06Q 10/10 (2012.01)
G06F 16/9535 (2019.01)
G06Q 30/02 (2012.01)

(52) U.S. Cl.
CPC ..... G06Q 10/1053 (2013.01); G06F 16/9535 (2019.01); G06Q 30/0251 (2013.01)

(58) Field of Classification Search
CPC ..... G06Q 10/1053; G06Q 30/02; H04L 67/22
See application file for complete search history.

(56) References Cited

U.S. PATENT DOCUMENTS

| | | | |
|---|---|---|---|
| 8,909,752 B1 | 12/2014 | Lidman et al. | |
| 9,152,727 B1 | 10/2015 | Balduccie et al. | |
| 2002/0032731 A1* | 3/2002 | Qian | G06F 16/954 709/204 |
| 2012/0209722 A1* | 8/2012 | Plut | G06Q 30/02 705/14.67 |
| 2013/0046823 A1* | 2/2013 | Mitchell | G06Q 10/107 709/204 |

(Continued)

FOREIGN PATENT DOCUMENTS

CA  2893358 A1 * 11/2016 ........... G06F 16/972

OTHER PUBLICATIONS

Srimani, P. K., & Srinivas, A. (Dec. 2011). Behavioral Targeting—Consumer Tracking. In AIP conference proceedings (vol. 1414, No. 1, pp. 56-60). American Institute of Physics. Reference discloses retargeting users based on online behavior and tracking the online behavior through cookies. (Year: 2011).*

(Continued)

*Primary Examiner* — Gabrielle A McCormick
*Assistant Examiner* — Maame Ofori-Awuah
(74) *Attorney, Agent, or Firm* — Anthony Curro, Esq.; McGinn I.P. Law Group, PLLC

(57) ABSTRACT

A resume remarketing method, system, and computer program product, including creating a remarketing cookie based on an interest factor of a first user in a first type of resume, matching the first user with a second user based on a similarity between a role of the first and second users, and transferring the remarketing cookie from the first user to the second user to remarket the first type of resume to the second user.

15 Claims, 5 Drawing Sheets

(56) References Cited

U.S. PATENT DOCUMENTS

| | | | |
|---|---|---|---|
| 2013/0054622 A1* | 2/2013 | Karmarkar | G06F 16/436 707/749 |
| 2013/0339142 A1 | 12/2013 | Hewinson | |
| 2014/0281031 A1* | 9/2014 | O'Connor | H04L 61/2007 709/245 |
| 2015/0032462 A1* | 1/2015 | Dardick | G06Q 10/1053 705/2 |
| 2015/0134433 A1* | 5/2015 | Muller | G06Q 30/0214 705/14.16 |
| 2016/0117740 A1* | 4/2016 | Linden | G06Q 30/0277 705/14.66 |
| 2016/0182660 A1 | 6/2016 | Byrne et al. | |

OTHER PUBLICATIONS

Mel, et al. "The NIST Definition of Cloud Computing". Recommendations of the National Institute of Standards and Technology. Nov. 16, 2015.

\* cited by examiner

SYSTEM, METHOD AND COMPUTER PROGRAM PRODUCT FOR REMARKETING AN ADVERTISED RESUME WITHIN GROUPS

BACKGROUND

The present invention relates generally to a resume remarketing method, and more particularly, but not by way of limitation, to a system, method, and computer program product for remarketing to a second recruiter (e.g., an individual) that may be staffing for a similar project or for a similar JRSS requirement based upon the explicit and implicit activities taken by another (e.g., a first) recruiter (e.g., another individual).

Existing remarketing techniques perform remarketing based upon prior behavior of users towards ads clicked upon, web portals visited, physical locations visited, attention spans, etc. However, remarketing has conventionally been confined to an individual's activities. That is, a first user is never remarketed because of an action that a second user took on an advertised element (e.g., a resume).

Thus, there is a technical problem in the conventional techniques that the conventional techniques only remarket an element based on individual activities instead of group activities.

SUMMARY

In an exemplary embodiment, the present invention can provide a computer-implemented resume remarketing method, the method including creating a remarketing cookie based on an interest factor of a first user in a first type of resume, matching the first user with a second user based on a similarity between a role (e.g., an organizational role) of the first and second users, and transferring the remarketing cookie from the first user to the second user to remarket the first type of resume to the second user.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
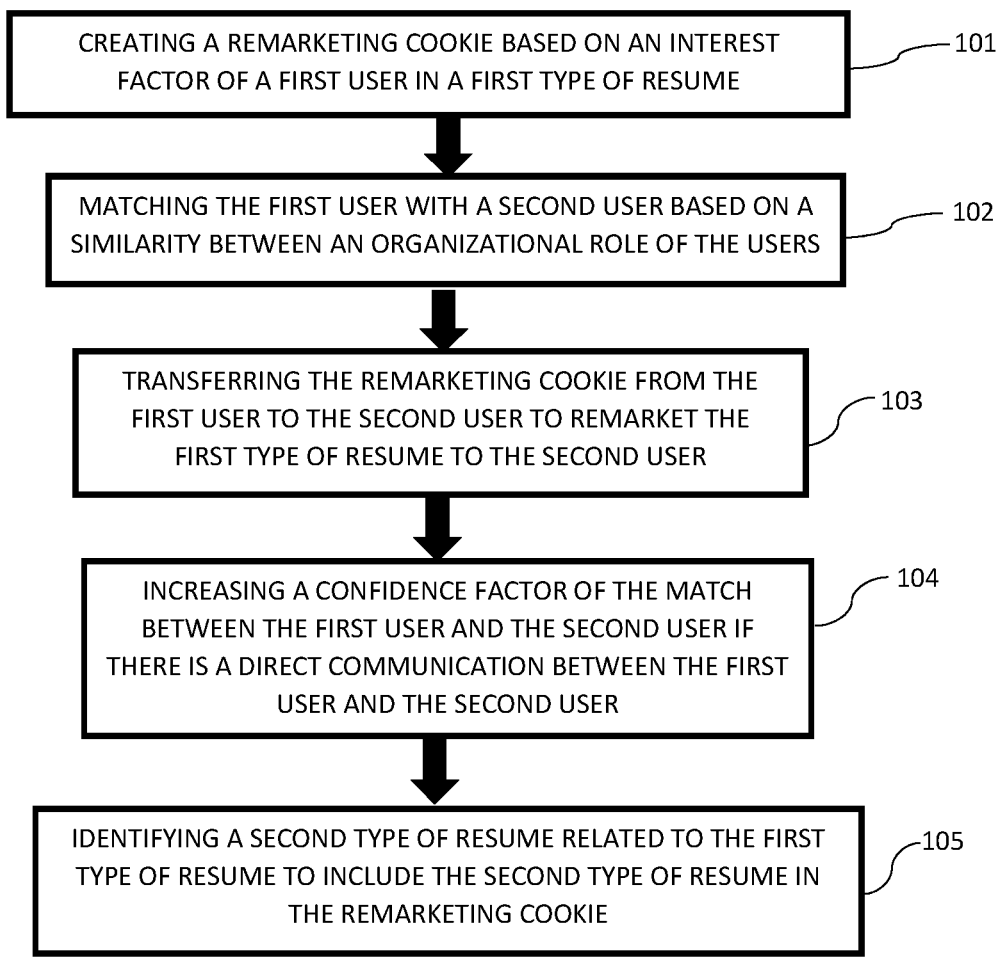
FIG. 1 exemplarily shows a high-level flow chart for a resume remarketing method 100 according to an embodiment of the present invention.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction of the example depicted in FIG. 1, an embodiment of a resume remarketing method 100 according to the present invention can include various steps for capturing interactions between a first and a second recruiter (e.g., first and second individuals) over different corporate channels and identifying an appropriate subset of candidates whose resumes can be good candidates for being remarketed (e.g., to the second recruiter). By way of introduction of the example depicted in FIG. 2, one or more computers of a computer system 12 according to an embodiment of the present invention can include a memory 28 having instructions stored in a storage system to perform the steps of FIG. 1.

Thus, a resume remarketing method 100 according to an embodiment of the present invention may act in a more sophisticated, useful and cognitive manner, giving the impression of cognitive mental abilities and processes related to knowledge, attention, memory, judgment and evaluation, reasoning, and advanced computation. In other words, a "cognitive" system can be said to be one that possesses macro-scale properties—perception, goal-oriented behavior, learning/memory and actions generally recognized as cognitive.

Although one or more embodiments may be implemented in a cloud environment 50 (see e.g., FIG. 3), it is nonetheless understood that the present invention can be implemented outside of the cloud environment.

In step 101, a remarketing cookie is created based on an interest factor of a first user (e.g., recruiter, human resources staff member, etc.) in a first type of resume. The first type of resume may represent an appropriate subset of candidates and features of their resumes (and identifying the favorable sentiments of the first user towards some or all of these candidates when the first user (e.g., recruiter) communicates to the second recruiter as described later) whose resumes will be perceived as good candidates for being remarketed to a second user.

For example, when the first type of resume draws the first user's attention, and the first user clicks on the resume, stares hard (e.g., above a predetermined threshold) at the resume (e.g., as detected by an eye gaze technology installed on the user device), moves the cursor over the resume, etc., a remarketing cookie is created and placed on the first user's device. The remarketing cookie indicates that the first user has interest in the resume and stores the data of the first type of resume.

In step 102, the first user is matched with a second user based on a similarity between a role (e.g., an organizational role) of the users. That is, the first user's role may be matched with an organizational taxonomy and/or type of position that the first user is recruiting for, and if it is found that the second user has a similar position in the taxonomy, as well as in the same division (e.g., within a same organization group within a company) with a similar job recruiter title, a same working project code, etc., the first user and the second user are matched for a potential transfer of the remarketing cookie to the second user.

It is noted that in one embodiment, the first and second users (e.g., recruiters) could be in different organizations or corporate entities, but could participate in the present invention (voluntarily) through a subscription service or the like.

For example, in some embodiments, the role of a recruiting individual staffer (e.g., a first user) is entered into a query system, that queries the organizational taxonomy and/or a type of position that the first user is recruiting for, and finds the other corporate recruitment staffer(s) (e.g., a second user(s)) with a similar position in the taxonomy, as well as in the same division with a similar position that they are recruiting for, and matches the second user with the first user. That is, relevant co-staffers are identified and matched with the first user, by exploring corporate taxonomy and databases, and analyzing corporate communications in multiple possible forms (such as corporate emails, instant messenger provided by the organization, spoken voices in a controlled corporate environment, etc.).

In other embodiments, the potential second user can be further limited based on a so called "cookie exchange plugin" being enabled on their device. The list of potential second users can be filtered by corporate device license databases, and corporate-registered device scans, that determine the presence of the cookie exchange plugin on their device. The plugin can be supported by the corporation so that the provider of the service implementing our invention can "push" and "pull" the cookies between users via the plugin.

In step 103, the remarketing cookie is transferred from (e.g., between) the first user to the second user to remarket the first type of resume to the second user. In other words, after the second user is identified to be potentially seeking a similar type of candidate as the first user, the remarketing cookie is transferred to the second user to remarket to the second user resumes that the first user found of interest.

In some embodiments, a detection of a communication between the first user and the second user can trigger the transfer of the remarketing cookie to be pushed from the device of the first user to the device of the second user. The remarketing cookie can be pushed as an attachment, component, data file, etc. in a direct communication (e.g., such as email, instant messenger etc.) from the first user to the second user. Alternatively, the remarketing cookie can be pulled from the device of the first user to the device of the second user, using a plugin. Even further, the plugin can control and auto-initiate the communication between users (e.g., the movement of the cookie from one device to the other). Thus, a next time that the second user (or first user) receives a personal communication (e.g., email, instant messenger, etc.) from the first user (or second user), the cookie is transferred such that the first type of resume is remarketed to the second user.

Therefore, in steps 101 to 103, a second user staffing for a same project (or similar set of projects) as a first user can have a resume remarketed to them based upon the explicit and implicit activities taken by the first user (e.g., the interest factor in the first type of resume).

Further, when the device of the second user receives the remarketing cookie, the next time the second user beings to open resumes, the first type of resume is displayed first.

In step 104, a confidence factor of the match between the first user and the second user is increased if there is a direct communication between the first user and the second user. That is, when the first user and the second user directly communicate about a specific job, type of recruitment, etc., a confidence factor is increased that the match of the first user to the second user is accurate. Thus, in some embodiments, the remarketing cookie will only be transferred between matching first and second users if the confidence factor is greater than a predetermined threshold value.

Further, a confidence factor can be learned based on feedback from if the second user has confidence in the first user or confidence that the match is relevant.

In it noted that in step 104, the confidence factor can be determined by analyzing corporate communications, such as corporate emails talking about staffing, and assigning a higher confidence if the staffing emails mention similar project names (e.g., detected via named entity recognition), and other communications such as instant messengers etc., between the first user and the second user. Also, the communication does not need to be a direct communication between the first user and the second user. That is, the communication can be between the second user to any user (i.e., any communication) that relates to the first type of resume such as mentioning the job position, the applicant, etc.

In other embodiments, such as in corporate settings with speech-to-text or speech tracking technology installed in a device, if the first user and the second user talk (e.g., as identified over either voice or face identification, by third-party modules, etc.) about the first type resume or a project where the first type of resume is relevant, then this event is detected and noted as an action of communication between the first user and second user relevant to the first type of resume to increase the confidence factor of the match. For example, if the first type of resume is mentioned in an email from the second user to the first user, then the confidence factor of the match is ranked "high" (e.g., a high value) and the remarketing cookie is transferred.

In step 105, a second type of resume related to the first type of resume or related to a different position is identified and included in the remarketing cookie. Therefore, the remarketing cookie can include multiple resumes or multiple types of resumes for different positions. Therefore, when the second user opens the resumes on the device, the second type of resume is displayed after the first type of resume when they are related, or the second type of resume is displayed when the job position related to the second type of resume (e.g., what drew the interest of the first user) is selected.

Figure 2:
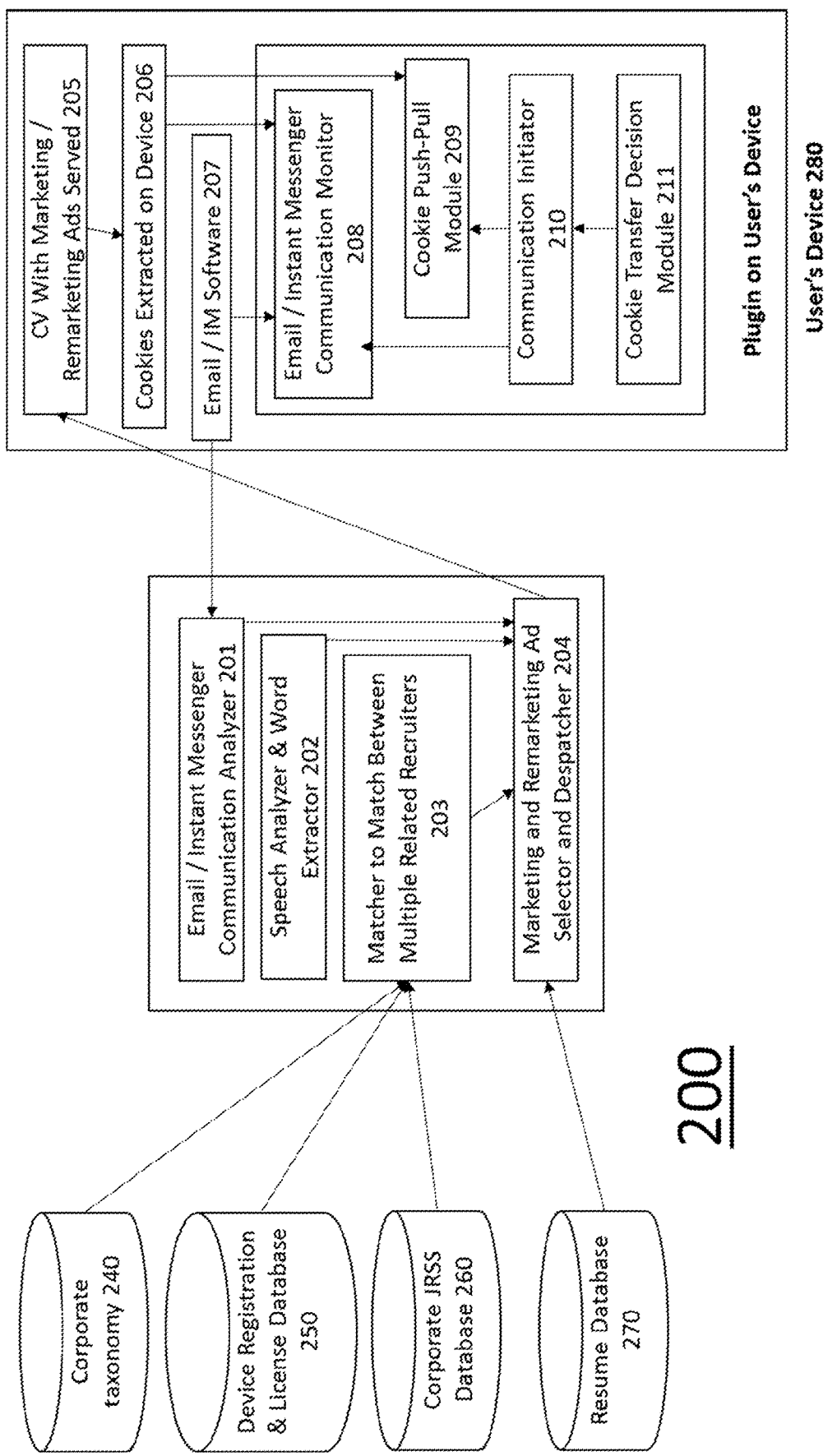
FIG. 2 exemplarily depicts an exemplary system 200 diagram according to an embodiment of the present invention.

FIG. 2 exemplarily depicts a system 200 that can execute the method 100. The marketing and remarketing ad selector and despatcher 204 and the speech analyzer and word extractor 202 creates a remarketing cookie based on an interest factor of a first user in a first type of resume from the resume database 270. The matcher 203 to match between multiple related recruited matches the first user with a second user based on a similarity between an organization role of the users as detected from the corporate taxonomy 240, the device registration and license database 250, and the corporate JRSS (job role & skill set) database 260. The e-mail/instant messenger communication analyzer 201 analyzes communications between the first user and the second user and can transfer the remarketing cookie from the first user to the second user to remarket the first type of resume to the second user. For example, the e-mail/IM software 207 on the user's device 280 (i.e., the second user) can interface with the e-mail/instant messenger communication analyzer 201 to analyze the communications between the users such that the e-mail instant messenger communication monitor 208 can request a transfer of the remarketing cookie between users when the users communicate with each other.

When the cookie transfer decision module 211 decides to transfer the remarketing cookie from the first user to the second user, the communication initiator 210 initiates a communication (such as an e-mail or auto sending of the remarketing cookie to the plug-in) such that the cookie push-pull module 209 can cause the remarketing cookie to be transferred between users. That is, the CV with marketing/remarketing ads served 205 (i.e., the remarketing cookie) and the cookies extracted on the device 206 (e.g., which remarketing cookies have been sent to the second user) are transferred between devices by the email/instant messenger communication monitor 208 and the cookie push-pull module 209.

Therefore, the method 100 and system 200 can remarket to a second user (e.g., an individual such as a recruiter), staffing for the same project (or similar set of projects), based upon the explicit and implicit activities (e.g., interest in a resume) taken by a first user (e.g., another individual such as a recruiter), by capturing the interactions between the first and the second recruiter over different channels, and identifying the appropriate subset of candidates (e.g., identifying the type of resume that the first user shows interest in) whose resume will be good candidates for being remarketed (to the second user). It is noted that the method 100 and system 200 can include a plugin from a remarketing/advertisement service provider, to conduct push-pull communication based movement of the remarketing cookies, as well as to attach the cookies as part of content in applications that the staffers use to perform communication with each other (such as email and instant messenger applications).

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
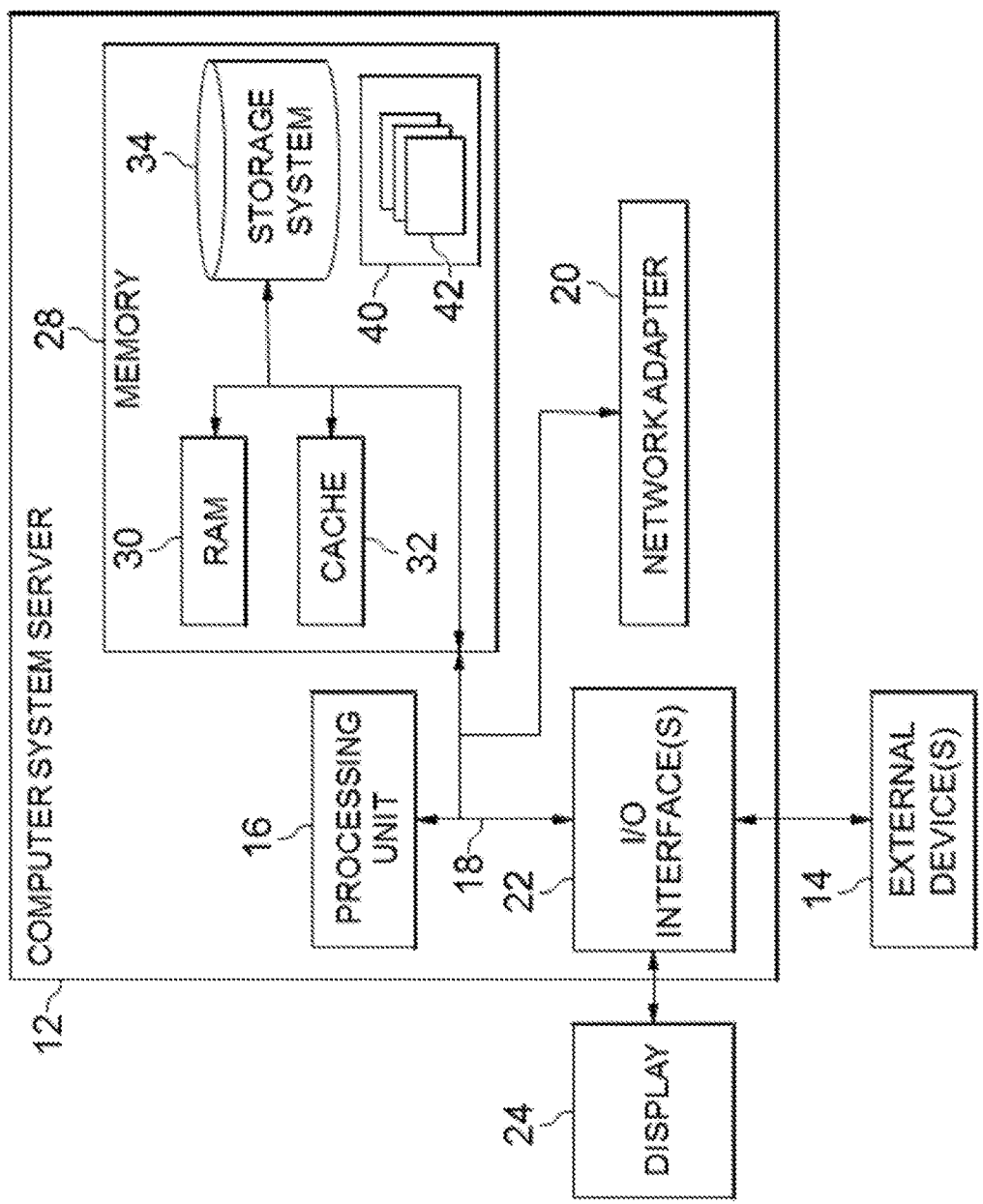
FIG. 3 depicts a cloud-computing node 10 according to an embodiment of the present invention.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
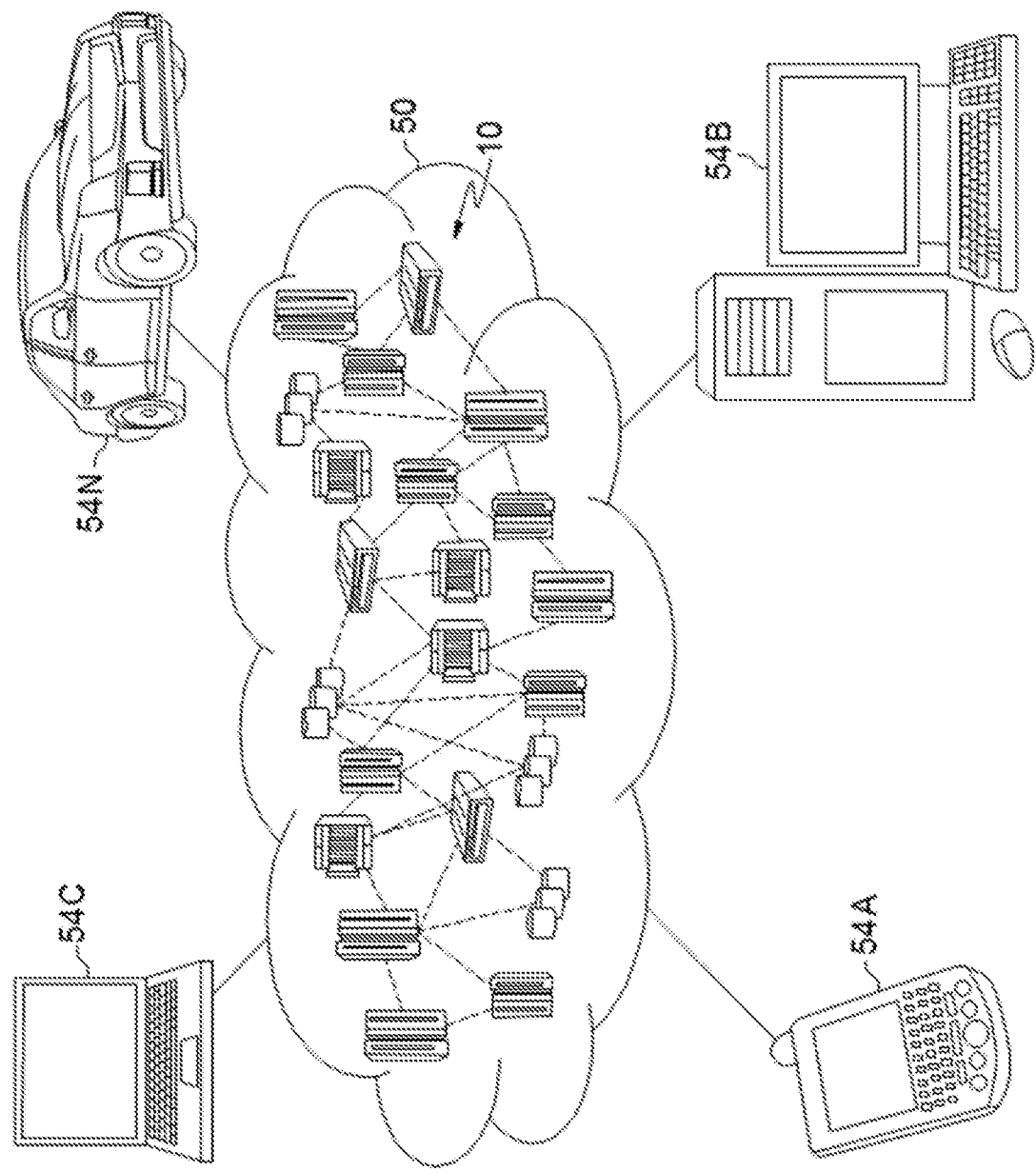
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
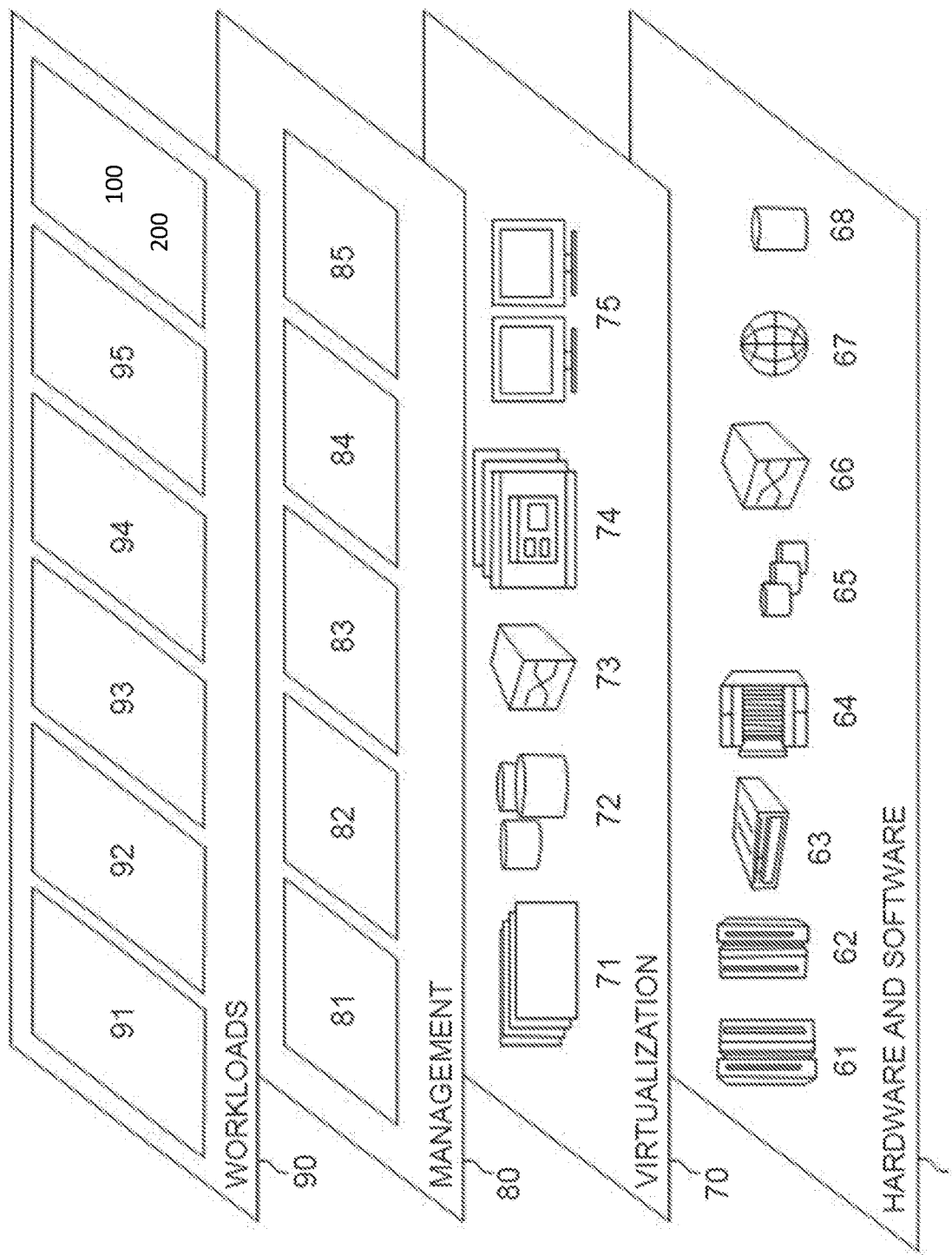
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resume remarketing method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A resume remarketing method, the method comprising:
creating a remarketing cookie based on an interest factor of a first user in a first type of resume according to a gaze, via eye-tracking technology, of the first user actually viewing the resume;
matching the first user with a second group of users based on a similarity between a role of the first and second group of users by detecting interactions between the first user and the second group of users over different channels of communication in a controlled corporate environment and identifying the resume for the second group of users from the resume viewed by the first user; and
transferring the remarketing cookie from the first user to the second group of users to remarket the first type of resume to the second group of users using a plugin for remarketing the resume to the second group of users during online or offline resume browsing or reading processes,
wherein the remarketing cookie is output to the second group of users as a data file,
further comprising:
increasing a confidence factor of the matching between the first user and the second group of users if there is a direct communication between the first user and the second group of users related to the first type of resume; and
identifying a second type of resume related to the first type of resume to include data of the second type of resume in the remarketing cookie that is transferred to the second group of users,
wherein the transferring transfers the remarketing cookie from the first user to the second group of users when the first user initiates a direct communication over one of the different channels with the second group of users as an attachment to the direct communication,
wherein the remarketing cookie is created on a first device belonging to the first user, and
wherein the transferring transfers the remarketing cookie from the first device belonging to the first user to a second device belonging to the second group of users,
wherein the first user device and the second group of users device each include a plug-in to automatically facilitate the transferring of the remarketing cookie between the first user device and the second group of users device.

2. The method of claim 1, further comprising increasing the confidence factor of the matching between the first user and the second group of users if there is a communication to any user by either of the first user or the second group of users related to the first type of resume over one of the different channels.

3. The method of claim 1, wherein the transferring automatically transfers the remarketing cookie from the first user to the second group of users over a network via the plugin connecting the users when the remarketing cookie is created.

4. The method of claim 1, wherein the remarketing cookie causes the first type of resume to be displayed before any other resume for the second group of users to review.

5. The method of claim 1, wherein the role comprises an organizational role which is detected by querying an organization database including at least one of an organizational taxonomy, a job title, and a job recruitment type.

6. The method of claim 1, wherein the transferring only transfers the remarketing cookie from the first user to the second group of users if a confidence factor in the matching is greater than a predetermined threshold value.

7. The method of claim 1, embodied in a cloud-computing environment.

8. The method of claim 1, further comprising increasing the confidence factor of the matching between the first user and the second group of users when there is a communication related to the first type of resume over one of the different channels.

9. The method of claim 1, wherein the transferring automatically transfers the remarketing cookie from the first user to the second group of users when the remarketing cookie is created.

10. The method of claim 1, wherein the remarketing cookie causes the first type of resume to be displayed before any other resume.

11. The method of claim 1, wherein the role comprises an organizational role which is detected by querying an organization database including an organizational taxonomy, a job title, and a job recruitment type.

12. A computer program product for resume remarketing, the computer program product comprising a computer readable storage medium having program instructions embodied therewith, the program instructions executable by a computer to cause the computer to perform:
creating a remarketing cookie based on an interest factor of a first user in a first type of resume according to a gaze, via eye-tracking technology, of the first user actually viewing the resume;
matching the first user with a second group of users based on a similarity between a role of the first and second group of users by detecting interactions between the first user and the second group of users over different channels of communication in a controlled corporate environment and identifying the resume for the second group of users from the resume viewed by the first user; and
transferring the remarketing cookie from the first user to the second group of users to remarket the first type of resume to the second group of users using a plugin for remarketing the resume to the second group of users during online or offline resume browsing or reading processes,
wherein the remarketing cookie is output to the second group of users as a data file, further comprising:
increasing a confidence factor of the matching between the first user and the second group of users if there is a direct communication between the first user and the second group of users related to the first type of resume; and
identifying a second type of resume related to the first type of resume to include data of the second type of resume in the remarketing cookie that is transferred to the second group of users,
wherein the transferring transfers the remarketing cookie from the first user to the second group of users when the first user initiates a direct communication over one of the different channels with the second group of users as an attachment to the direct communication,
wherein the remarketing cookie is created on a first device belonging to the first user, and
wherein the transferring transfers the remarketing cookie from the first device belonging to the first user to a second device belonging to the second group of users,
wherein the first user device and the second group of users device each include a plug-in to automatically facilitate the transferring of the remarketing cookie between the first user device and the second group of users device.

13. The computer program product of claim 12, further comprising increasing the confidence factor of the matching between the first user and the second group of users if there is a communication to any user by either of the first user or the second group of users related to the first type of resume over one of the different channels.

14. A resume remarketing system, said system comprising:
a processor; and
a memory, the memory storing instructions to cause the processor to perform:
creating a remarketing cookie based on an interest factor of a first user in a first type of resume according to a gaze, via eye-tracking technology, of the first user actually viewing the resume;
matching the first user with a second group of users based on a similarity between a role of the first and second group of users by detecting interactions between the first user and the second group of users over different channels of communication in a controlled corporate environment and identifying the resume for the second group of users from the resume viewed by the first user; and
transferring the remarketing cookie from the first user to the second group of users to remarket the first type of resume to the second group of users using a plugin for remarketing the resume to the second group of users during online or offline resume browsing or reading processes,
wherein the remarketing cookie is output to the second group of users as a data file,
wherein the memory further stores instructions to cause the processor to perform:
increasing a confidence factor of the matching between the first user and the second group of users if there is a direct communication between the first user and the second group fusers related to the first type of resume; and
identifying a second type of resume related to the first type of resume to include data of the second type of resume in the remarketing cookie that is transferred to the second group of users,
wherein the transferring transfers the remarketing cookie from the first user to the second group of users when the first user initiates a direct communication over one of the different channels with the second group of users as an attachment to the di communication,
wherein the remarketing cookie is created on a first device belonging to the first user, and
wherein the transferring transfers the remarketing cookie from the first device belonging to the first user to a second device belonging to the second group of users,
wherein the first user device and the second group of users device each include a plug-in to automatically facilitate the transferring of the remarketing cookie between the first user device and the second group of users device.

15. The system of claim 14, embodied in a cloud-computing environment.

* * * * *